(12) United States Patent
Kishek

(10) Patent No.: US 6,644,953 B2
(45) Date of Patent: Nov. 11, 2003

(54) HAMBURGER PATTY MAKING SYSTEM

(76) Inventor: Samaan J. Kishek, 23 Aguilar, Irvine, CA (US) 92614

( * ) Notice: Subject to any disclaimer, the term of this patent is extended or adjusted under 35 U.S.C. 154(b) by 321 days.

(21) Appl. No.: 09/872,020

(22) Filed: Jun. 1, 2001

(65) Prior Publication Data

US 2002/0178927 A1 Dec. 5, 2002

(51) Int. Cl.$^7$ ................................................ A21C 3/00
(52) U.S. Cl. ....................... 425/318; 425/355; 425/408; 425/454; 426/512
(58) Field of Search ................................ 425/318, 352, 425/355, 408, 453, 454; 426/512, 518

(56) References Cited

U.S. PATENT DOCUMENTS

| | | | |
|---|---|---|---|
| 3,590,749 A | * | 7/1971 | Burns et al. .................. 425/195 |
| 3,685,936 A | * | 8/1972 | Meth et al. .............. 425/192 R |
| 3,752,622 A | * | 8/1973 | Viadana ........................ 425/78 |
| 4,106,162 A | * | 8/1978 | Fournier ..................... 425/298 |
| 6,242,027 B1 | * | 6/2001 | Grieco ........................ 425/355 |

* cited by examiner

*Primary Examiner*—Robert Davis
*Assistant Examiner*—Thu Khanh T. Nguyen
(74) *Attorney, Agent, or Firm*—Goldstein & Lavas, P.C.

(57) ABSTRACT

A hamburger patty making system including a housing having a central aperture extending therethrough. The housing has a channel extending inwardly thereof in communication with the central aperture. A press is coupled with respect to the housing. The press includes a handle portion having a first end and a second end. The first end is hingedly coupled with the housing. The press includes an upper container portion disposed over the central aperture of the housing in a lowered orientation. A lower container portion is removably received within the central aperture of the housing. The lower container portion includes a cup portion adapted for being seated within the central aperture. The cup portion has an open upper end and a closed lower end. The closed lower end has a central opening therethrough. A piston is removably coupled with respect to the lower container portion. The piston includes an upper circular plate. The plate is seated on the closed lower end of the cup portion. A lever couples with the piston to facilitate raising and lowering thereof with respect to the upper container portion.

7 Claims, 4 Drawing Sheets

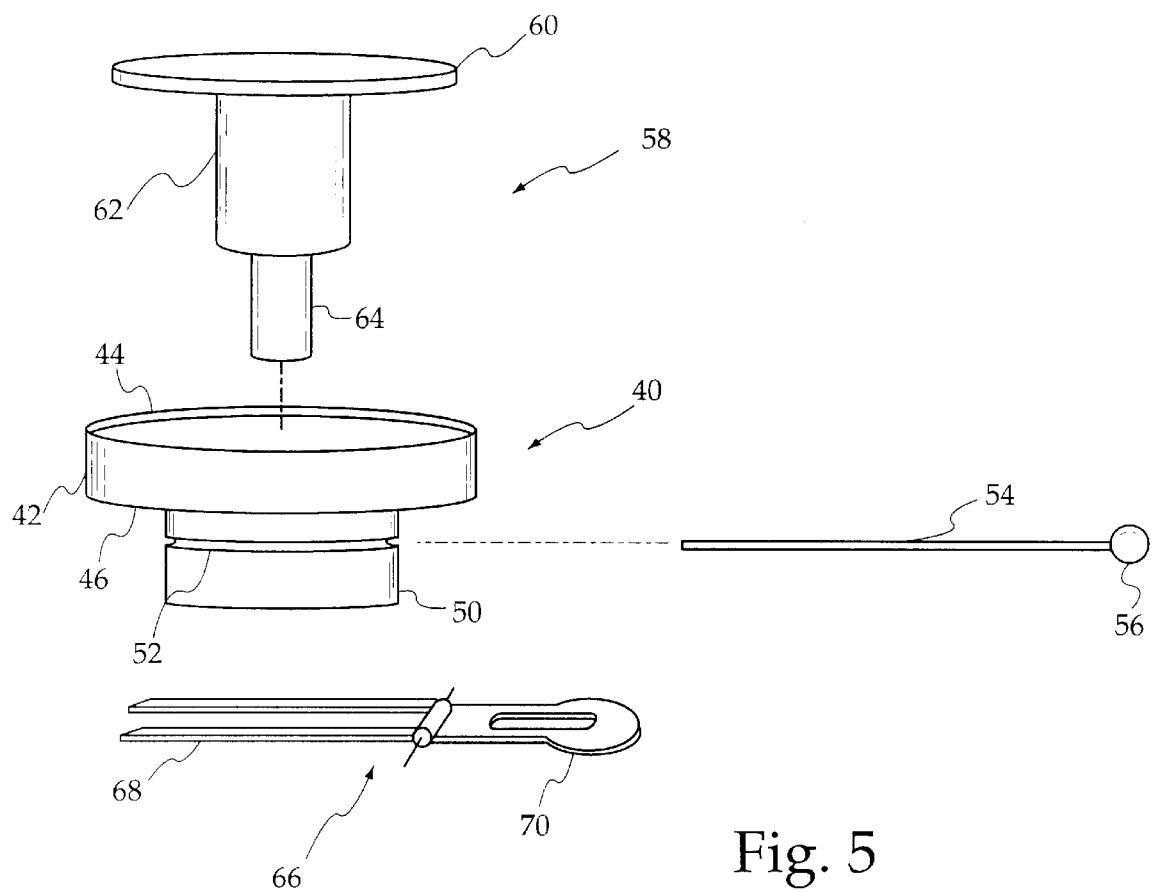
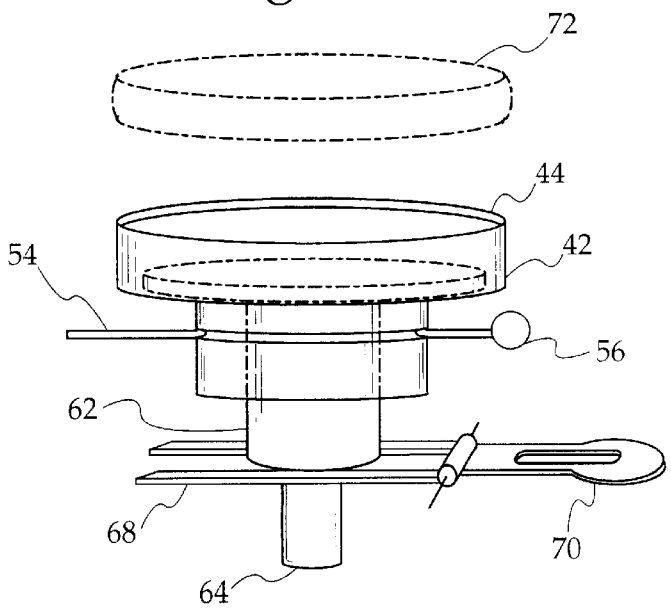

HAMBURGER PATTY MAKING SYSTEM

BACKGROUND OF THE INVENTION

The present invention relates to a hamburger patty making system and more particularly pertains to allowing uniform hamburger patties to be easily made.

The use of food processing presses is known in the prior art. More specifically, food processing presses heretofore devised and utilized for the purpose of pressing foods into molded shapes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,924,308 to Neri discloses a molding device for compressing meat into uniform hamburger patties and includes means to release the patties by releasing the pressure on the cover plate. U.S. Pat. Nos. Des. 155,422 to Henderson and Des. 245,827 to Korpi disclose ornamental designs for various hamburger meat presses.

While these devices fulfill their respective, particular objective and requirements, the aforementioned patents do not describe a hamburger patty making system for allowing uniform hamburger patties to be easily made.

In this respect, the hamburger patty making system according to the present invention substantially departs from the conventional concepts and designs of the prior art, and in doing so provides an apparatus primarily developed for the purpose of allowing uniform hamburger patties to be easily made.

Therefore, it can be appreciated that there exists a continuing need for a new and improved hamburger patty making system which can be used for allowing uniform hamburger patties to be easily made. In this regard, the present invention substantially fulfills this need.

SUMMARY OF THE INVENTION

In the view of the foregoing disadvantages inherent in the known types of food processing presses now present in the prior art, the present invention provides an improved hamburger patty making system. As such, the general purpose of the present invention, which will be described subsequently in greater detail, is to provide a new and improved hamburger patty making system which has all the advantages of the prior art and none of the disadvantages.

To attain this, the present invention essentially comprises a housing having a generally rectangular configuration. The housing includes a top tray and a bottom tray. The top tray and the bottom tray each have an upper surface, a lower surface, a front wall, a back wall, a first side wall, and a second side wall. The housing has a central aperture extending through the top tray and the bottom tray. The front wall of the bottom tray has a channel extending inwardly thereof in communication with the central aperture. The first side wall of the top tray has a side aperture therein in communication with the central aperture. A press is coupled with respect to the housing. The press includes an angularly oriented handle portion having a first end and a second end. The first end is hingedly coupled with the back wall of the top tray of the housing. The press includes an upper container portion secured thereto. The upper container portion has a generally cylindrical configuration defined by a closed upper end and a wider open lower end. The closed upper end is secured to the second end by a cylindrical extension. The upper container portion is disposed over the central aperture of the housing in a lowered orientation. A lower container portion is removably received within the central aperture of the housing. The lower container portion includes a cup portion adapted for being seated within the central aperture. The cup portion has an open upper end and a closed lower end. The closed lower end has a central opening therethrough. The central opening has an open ended cylindrical sleeve extending downwardly therefrom. The cylindrical sleeve has an annular recess formed therein. The annular recess is linearly aligned with the side aperture of the first side wall of the top tray of the housing. A locking rod extends through the side aperture and is positioned within the annular recess to preclude removal of the lower container portion from the central aperture. A piston is removably coupled with respect to the lower container portion. The piston includes an upper circular plate. The plate is seated on the closed lower end of the cup portion. The plate has a wide cylindrical base extending downwardly therefrom through the central opening and the open ended cylindrical sleeve. The base has a narrow cylindrical stem extending downwardly therefrom. A lever couples with the piston to facilitate raising and lowering thereof with respect to the upper container portion. The lever includes an inner fork portion and an outer handle portion. The inner fork portion extends through the channel in the front wall of the lower tray of the housing and into the central aperture. The fork portion engages the narrow-cylindrical stem of the piston. The outer handle portion is disposed outwardly of the housing to facilitate raising and lowering of the inner fork portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hamburger patty making system which has all the advantages of the prior art food processing presses and none of the disadvantages.

It is another object of the present invention to provide a new and improved hamburger patty making system which may be easily and efficiently manufactured and marketed.

It is a further object of the present invention to provide a new and improved hamburger patty making system which is of durable and reliable construction.

An even further object of the present invention is to provide a new and improved hamburger patty making system which is susceptible of a low cost of manufacture with regard to both materials and labor, and which accordingly is then susceptible of low prices of sale to the consuming public, thereby making such a hamburger patty making system economically available to the buying public.

Even still another object of the present invention is to provide a new and improved hamburger patty making system for allowing uniform hamburger patties to be easily made.

Lastly, it is an object of the present invention to provide a new and improved hamburger patty making system including a housing having a central aperture extending therethrough. The housing has a channel extending inwardly thereof in communication with the central aperture. A press is coupled with respect to the housing. The press includes a handle portion having a first end and a second end. The first end is hingedly coupled with the housing. The press includes an upper container portion disposed over the central aperture of the housing in a lowered orientation. A lower container portion is removably received within the central aperture of the housing. The lower container portion includes a cup portion adapted for being seated within the central aperture. The cup portion has an open upper end and a closed lower end. The closed lower end has a central opening therethrough. A piston is removably coupled with respect to the lower container portion. The piston includes an upper circular plate. The plate is seated on the closed lower end of the cup portion. A lever couples with the piston to facilitate raising and lowering thereof with respect to the upper container portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an exploded perspective view of the piston, container, and release lever of the present invention.

FIG. 5 is a perspective view of the piston, container, and release lever illustrating the removal of a made hamburger patty.

The same reference numerals refer to the same parts through the various figures.

DESCRIPTION OF THE PREFERRED EMBODIMENT

Figure 1:
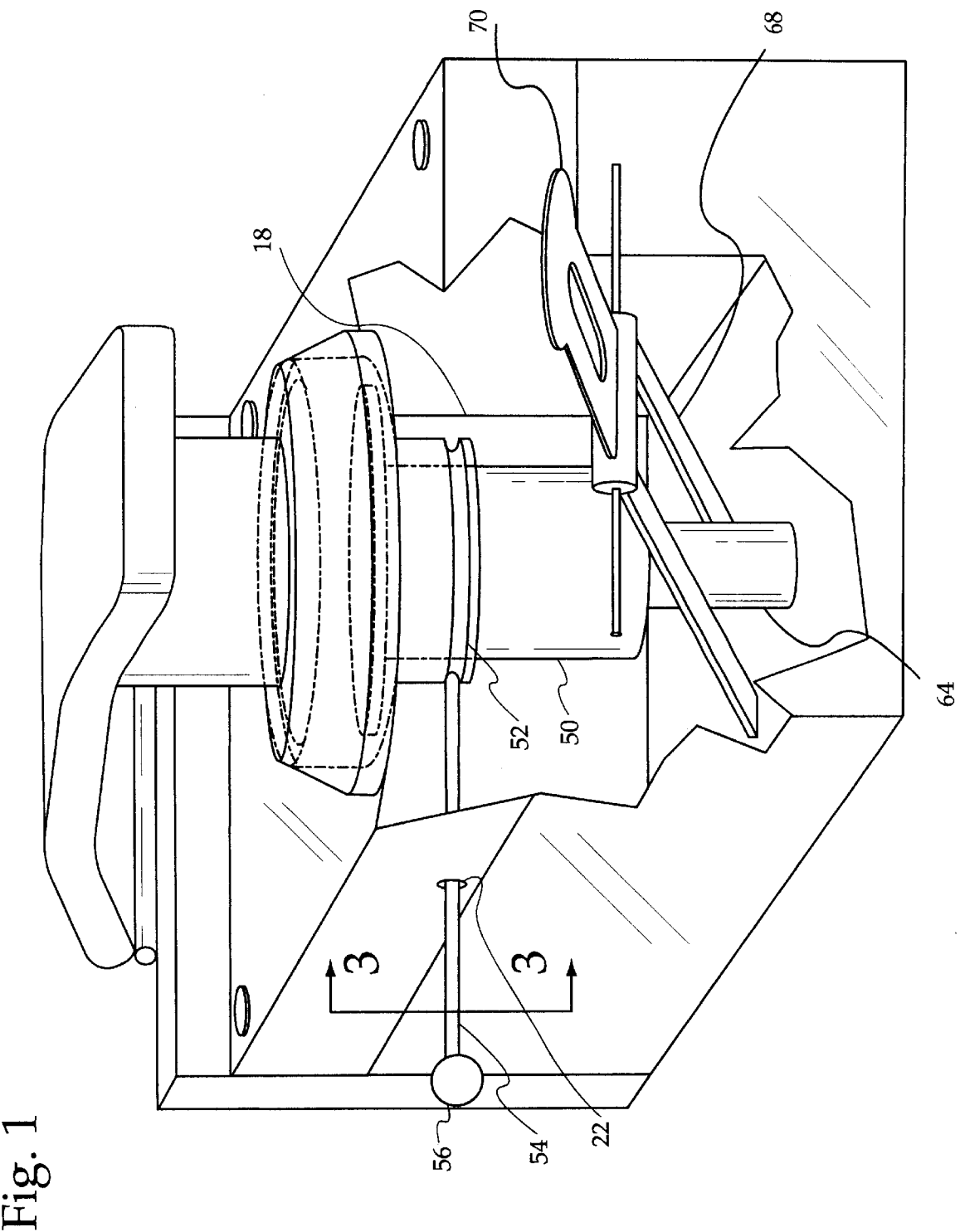
FIG. 1 is a perspective view of the preferred embodiment of the hamburger patty making system constructed in accordance with the principles of the present invention.
Figure 2:
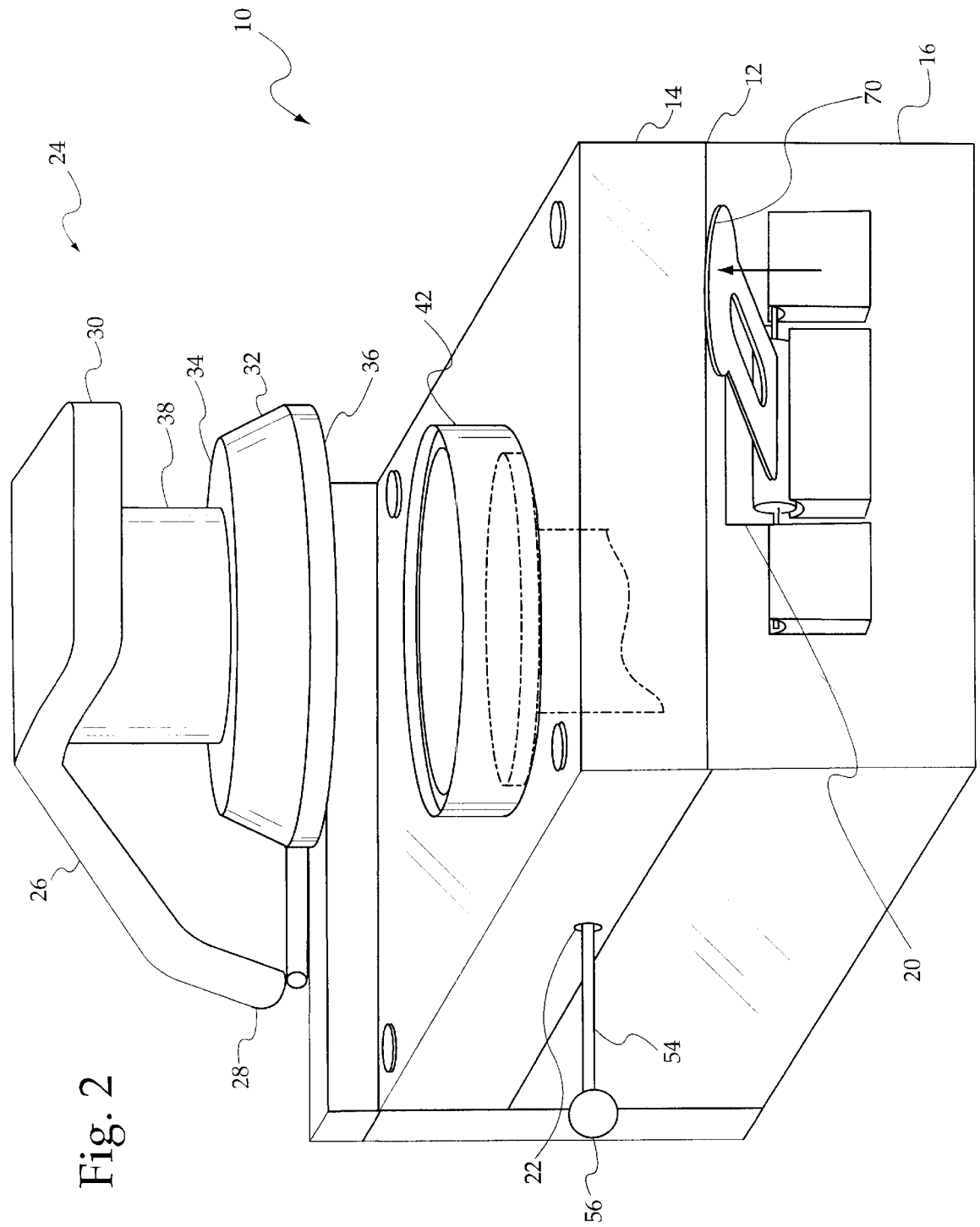
FIG. 2 is a perspective view of the present invention illustrated with a press thereon in a raised orientation.
Figure 3:
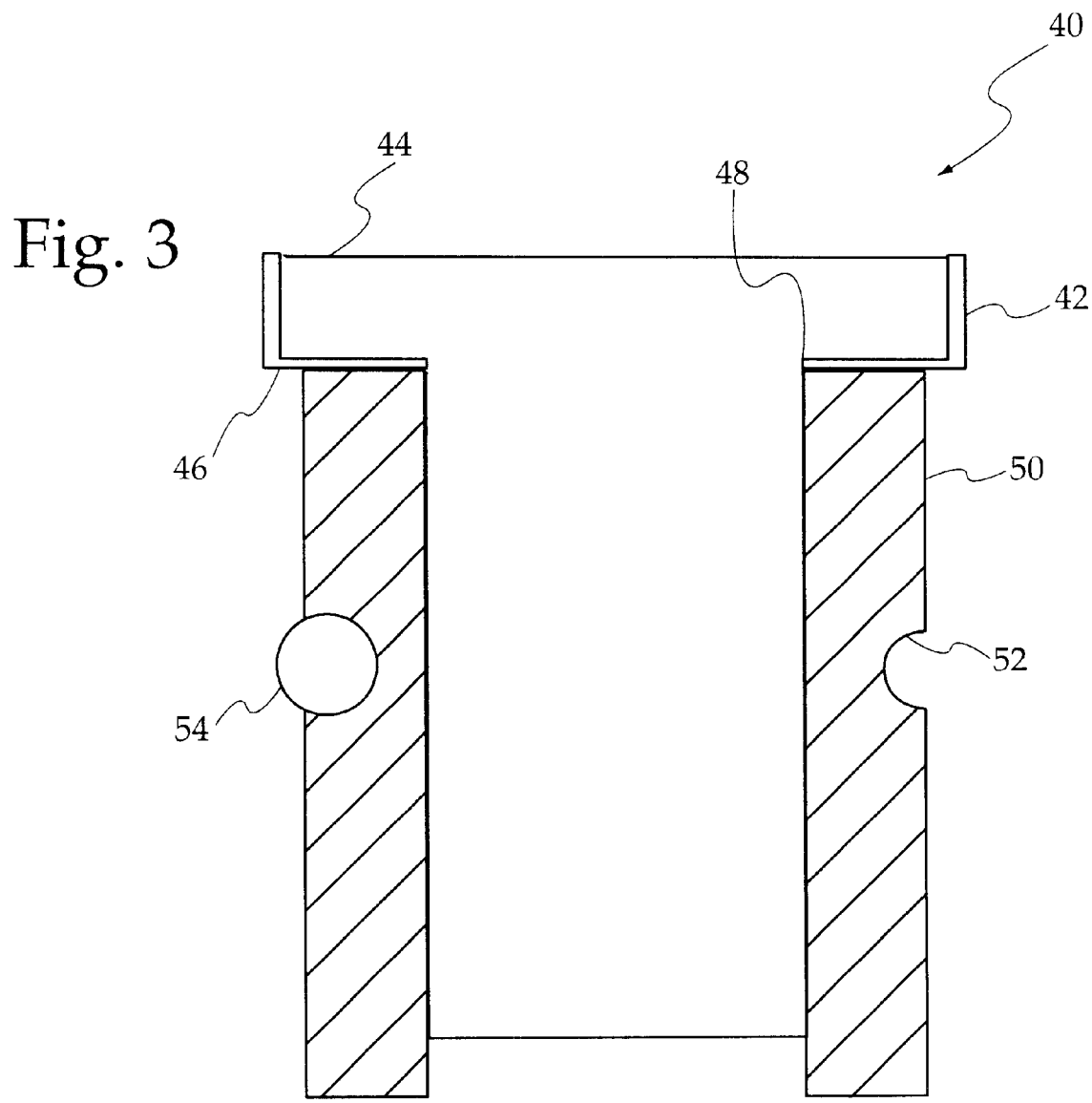
FIG. 3 is a cross-sectional view of the present invention as taken along line 3—3 of FIG. 1.

With reference now to the drawings, and in particular, to figures one through five thereof, the preferred embodiment of the new and improved hamburger patty making system embodying the principles and concepts of the present invention and generally designated by the reference number 10 will be described.

Specifically, it will be noted in the various figures that the device relates to a hamburger patty making system for allowing uniform hamburger patties to be easily made. In its broadest context, the device consists of a housing, a press, a lower container portion, a piston, and a lever. Such components are individually configured and correlated with respect to each other so as to attain the desired objective.

The housing 12 has a generally rectangular configuration. The housing 12 includes a top tray 14 and a bottom tray 16. The top tray 14 and the bottom tray 16 each have an upper surface, a lower surface, a front wall, a back wall, a first side wall, and a second side wall. The housing 12 has a central aperture 18 extending through the top tray 14 and the bottom tray 16. The front wall of the bottom tray 16 has a channel 20 extending inwardly thereof in communication with the central aperture 18. The first side wall of the top tray 14 has a side aperture 22 therein in communication with the central aperture 18.

The press 24 is coupled with respect to the housing 12. The press 24 includes an angularly oriented handle portion 26 having a first end 28 and a second end 30. The first end 28 is hingedly coupled with the back wall of the top tray 14 of the housing 12. The press 24 includes an upper container portion 32 secured thereto. The upper container portion 32 has a generally cylindrical configuration defined by a closed upper end 34 and a wider open lower end 36. The closed upper end 34 is secured to the second end 30 by a cylindrical extension 38. The upper container portion 32 is disposed over the central aperture 18 of the housing 12 in a lowered orientation. Note FIG. 1.

The lower container portion 40 is removably received within the central aperture 18 of the housing 12. The lower container portion 40 includes a cup portion 42 adapted for being seated within the central aperture 18. The cup portion 42 has an open upper end 44 and a closed lower end 46. The closed lower end 46 has a central opening 48 therethrough. The central opening 48 has an open ended cylindrical sleeve 50 extending downwardly therefrom. The cylindrical sleeve 50 has an annular recess 52 formed therein. The annular recess 52 is linearly aligned with the side aperture 20 of the first side wall of the top tray 14 of the housing 12. A locking rod 54 extends through the side aperture 20 and is positioned within the annular recess 52 to preclude removal of the lower container portion 40 from the central aperture 18. The locking rod 54 includes a grasping handle 56 on an outer end thereof to facilitate the manipulation thereof.

The piston 58 is removably coupled with respect to the lower container portion 40. The piston 58 includes an upper circular plate 60. The plate 60 is seated on the closed lower end 46 of the cup portion 42. The plate 60 has a wide cylindrical base 62 extending downwardly therefrom through the central opening 48 and the open ended cylindrical sleeve 50. The base 62 has a narrow cylindrical stem 64 extending downwardly therefrom.

The lever 66 couples with the piston 58 to facilitate raising and lowering thereof with respect to the upper container portion 40. The lever 66 includes an inner fork portion 68 and an outer handle portion 70. The inner fork portion 68 extends through the channel 20 in the front wall of the lower tray 16 of the housing 12 and into the central aperture 18. The fork portion 68 engages the narrow cylindrical stem 64 of the piston 58. The outer handle portion 70 is disposed outwardly of the housing 12 to facilitate raising and lowering of the inner fork portion 68.

In use, the present invention will assemble a mound of ground beef, or other ground meat, into a patty 72. When the present invention is fully assembled, as in figures one and two, the press 24 is raised to allow the ground meat to be positioned within the cup portion 42 atop the plate 60 of the piston 58. The press 24 is then lowered whereby the upper container portion 32 presses the meat downwardly against the plate 60 and the periphery of the cup portion 42. The press 24 is then raised upwardly to expose the cup portion 42. The outer handle portion 70 is then lowered to cause the inner fork portion 68 to raise thereby raising the piston 58 upwardly with respect to the lower container portion 40 so that the patty 72 can be removed from the plate 60. To remove the lower container portion 40 from the central aperture 18, the locking rod 54 is simply removed from the housing 12 to allow the lower container portion 40 to be lifted outwardly of the housing 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hamburger patty making system for allowing uniform hamburger patties to be easily made comprising, in combination:

a housing having a generally rectangular configuration, the housing including a top tray and a bottom tray, the top tray and the bottom tray each having an upper surface, a lower surface, a front wall, a back wall, a first side wall, and a second side wall, the housing having a central aperture extending through the top tray and the bottom tray, the front wall of the bottom tray having a channel extending inwardly thereof in communication with the central aperture, the first side wall of the top tray having a side aperture therein in communication with the central aperture;

a press coupled with respect to the housing, the press including an angularly oriented handle portion having a first end and a second end, the first end being hingedly coupled with the back wall of the top tray of the housing, the press including an upper container portion secured thereto, the upper container portion having a generally cylindrical configuration defined by a closed upper end and a wider open lower end, the closed upper end being secured to the second end by a cylindrical extension, the upper container portion being disposed over the central aperture of the housing in a lowered orientation;

a lower container portion removably received within the central aperture of the housing, the lower container portion including a cup portion adapted for being seated within the central aperture, the cup portion having an open upper end and a closed lower end, the closed lower end having a central opening therethrough, the central opening having an open ended cylindrical sleeve extending downwardly therefrom, the cylindrical sleeve having an annular recess formed therein, the annular recess being linearly aligned with the side aperture of the first side wall of the top tray of the housing, a locking rod extending through the side aperture and being positioned within the annular recess to preclude removal of the lower container portion from the central aperture;

a piston removably coupled with respect to the lower container portion, the piston including an upper circular plate, the plate being seated on the closed lower end of the cup portion, the plate having a wide cylindrical base extending downwardly therefrom through the central opening and the open ended cylindrical sleeve, the base having a narrow cylindrical stem extending downwardly therefrom; and a lever coupling with the piston to facilitate raising and lowering thereof with respect to the upper container portion, the lever including an inner fork portion and an outer handle portion, the inner fork portion extending through the channel in the front wall of the lower tray of the housing and into the central aperture, the fork portion engaging the narrow cylindrical stem of the piston, the outer handle portion being disposed outwardly of the housing to facilitate raising and lowering of the inner fork portion.

2. A hamburger patty making system for allowing uniform hamburger patties to be easily made comprising, in combination:

a housing having a central aperture extending therethrough, the housing having a channel extending inwardly thereof in communication with the central aperture;

a press coupled with respect to the housing, the press including a handle portion having a first end and a second end, the first end being hingedly coupled with the housing, the press including an upper container portion disposed over the central aperture of the housing in a lowered orientation;

a lower container portion removably received within the central aperture of the housing, the lower container portion including a cup portion adapted for being seated within the central aperture, the cup portion having an open upper end and a closed lower end, the closed lower end having a central opening therethrough, the central opening having an open ended cylindrical sleeve extending downwardly therefrom, the cylindrical sleeve having an annular recess formed therein, the annular recess being linearly aligned with a side aperture of the housing, a locking rod extending through the side aperture and being positioned within the annular recess to preclude removal of the lower container portion from the central aperture;

a piston removably coupled with respect to the lower container portion, the piston including an upper circular plate, the plate being seated on the closed lower end of the cup portion; and a lever coupling with the piston to facilitate raising and lowering thereof with respect to the upper container portion.

3. The hamburger patty making system as set forth in claim two, wherein the housing has a generally rectangular configuration, the housing including a top tray and a bottom tray, the top tray and the bottom tray each having an upper surface, a lower surface, a front wall, a back wall, a first side wall, and a second side wall, the central aperture extending through the top tray and the bottom tray, the front wall of the bottom tray having the channel extending inwardly thereof in communication with the central aperture.

4. The hamburger patty making system as set forth in claim two, wherein the handle portion of the press is angularly oriented.

5. The hamburger patty making system as set forth in claim two, wherein the upper container portion of the press has a generally cylindrical configuration defined by a closed upper end and a wider open lower end, the closed upper end being secured to the second end by a cylindrical extension, the upper container portion being disposed over the central aperture of the housing in a lowered orientation.

6. The hamburger patty making system as set forth in claim two, wherein the plate has a wide cylindrical base extending downwardly therefrom through the central opening of the lower container portion, the base having a narrow cylindrical stem extending downwardly therefrom.

7. The hamburger patty making system as set forth in claim six, wherein the lever includes an inner fork portion and an outer handle portion, the inner fork portion extending through the channel in the front wall of the lower tray of the housing and into the central aperture, the fork portion engaging the narrow cylindrical stem of the piston, the outer handle portion being disposed outwardly of the housing to facilitate raising and lowering of the inner fork portion.

* * * * *